R. WATRES.
LOCKING NUT.
APPLICATION FILED JUNE 7, 1912.
1,088,750.
Patented Mar. 3, 1914.
Fig. 1.
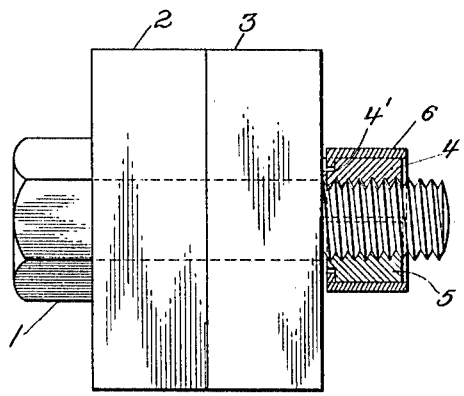
Fig. 2.  Fig. 3.  Fig. 4.
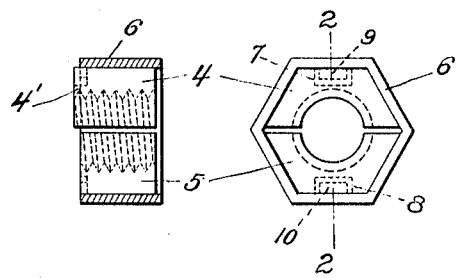 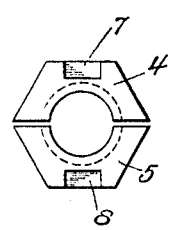
Fig. 5.
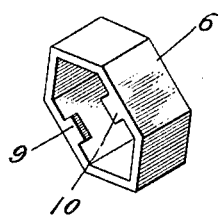
Witnesses:
L. L. Browning
John Darby
Reyburn Watres Inventor
By his Attorney
Edward C. Davidson

UNITED STATES PATENT OFFICE.

REYBURN WATRES, OF SCRANTON, PENNSYLVANIA.

LOCKING-NUT.

1,088,750.  Specification of Letters Patent. Patented Mar. 3, 1914.

Application filed June 7, 1912. Serial No. 702,179.

*To all whom it may concern:*

Be it known that I, REYBURN WATRES, a citizen of the United States of America, residing in the city of Scranton, county of Lackawanna, and State of Pennsylvania, have invented a certain new and useful Improved Locking-Nut, of which the following is a specification.

In the accompanying drawing: Figure 1 is a side elevation partly in section; Fig. 2, a section on the line 2, 2, of Fig. 3: Fig. 3, a top plan view of the end and a polygonal sleeve surrounding it: Fig. 4, a bottom plan view of the nut: and Fig. 5, a perspective view of the nut sleeve.

1 is an ordinary screw bolt shown as passing through parts 2, 3, from the latter of which its threaded end extends. The nut is composed of two circumferentially equal parts 4, 5,—that is to say, it is divided longitudinally into equal sections each of which contains half of a screw thread that is completed when the two are placed together. The sections of such a nut may be brought together laterally around the bolt and when enveloped by a sleeve 6 that conforms to the exterior of the nut may be screwed up as is an ordinary nut.

The primary feature of this invention consists in making one of the nut sections; say section 4, somewhat longer than the other and so threading them that the complete thread will be formed when the two sections are brought together with their outer end faces flush, in which case the inner face 4' of section 4 extends beyond the inner face of the section 5 and, consequently, when the nut is screwed up, the longer section will be crowded outwardly along the threaded bolt and will bind the threads of the bolt and those of that nut section together. This may result in bruising the threads, the extent to which that occurs being dependent upon the power exerted in turning the nut. Experience has shown that when such a sectional nut and sleeve are screwed up tight there is a tendency to bind the sleeve upon the nut and in some relations no further means for preventing the sleeve from leaving the nut need be provided.

Where the sleeve is to be positively locked against withdrawal from the nut, the following plan may be adopted. On the under face of each nut section is a recess 7, 8, in which fit lugs 9, 10, projecting inwardly from the inner edge of the sleeve. With this form of device, the nut sections are dropped into position through the top of the sleeve and then the nut with the sleeve surrounding it is applied to the bolt in the ordinary way. Of course, the locking effect described is equally present.

Such a longitudinally divided nut may be made in a variety of ways. For instance, the nut may, in the first instance, be solid and be divided by a sawing operation; or, the sections may be separately formed and each provided with a half thread by a cutting operation; or a blank for each nut section may be provided and the nut section formed up, thread and all, by a drop forging operation.

I claim—

1. A locking nut composed of two separated longitudinal sections each of which has half a complete thread and one of which is longer than the other combined with a sleeve enveloping the nut and adapted to receive a turning wrench.

2. A locking nut composed of two separated longitudinal sections each of which has half a complete thread and one of which is longer than the other and each having a recess on its inner face combined with an enveloping sleeve having at its inner edge projections adapted to seat in said recesses.

3. A nut lock composed of two separated longitudinal sections each of which has half a complete thread combined with a sleeve enveloping the nut and adapted to receive a wrench.

4. A locking nut composed of two separated longitudinal sections each of which has half a complete thread and one of which is longer than the other combined with a sleeve enveloping the nut and adapted to receive a turning wrench the nut sections and sleeve being provided with means for retaining the sleeve in position around the nut.

In testimony whereof, I have hereunto subscribed my name.

REYBURN WATRES.

Witnesses:
ROBERT A. HULL,
HAROLD DOUD.

Copies of this patent may be obtained for five cents each, by addressing the "Commissioner of Patents, Washington, D. C."